United States Patent [19]

Kanda et al.

[11] Patent Number: 4,605,603
[45] Date of Patent: Aug. 12, 1986

[54] HERMETICALLY SEALED METALLIC OXIDE-HYDROGEN BATTERY USING HYDROGEN STORAGE ALLOY

[75] Inventors: Motoya Kanda; Yuji Sato, both of Yokohama, Japan

[73] Assignee: Kabushiki Kaisha Toshiba, Kawasaki, Japan

[21] Appl. No.: 684,587

[22] Filed: Dec. 21, 1984

[30] Foreign Application Priority Data

Dec. 26, 1983 [JP] Japan ............... 58-243708
Jun. 14, 1984 [JP] Japan ............... 59-120826
Jun. 30, 1984 [JP] Japan ............... 59-135908

[51] Int. Cl.$^4$ ............... H01M 10/34; H01M 4/36
[52] U.S. Cl. ............... 429/59; 429/57; 429/101; 429/214; 420/900
[58] Field of Search ............... 429/57, 59, 60, 214, 429/101; 420/900

[56] References Cited

U.S. PATENT DOCUMENTS

| | | | |
|---|---|---|---|
| 3,023,258 | 5/1958 | Peters | 136/6 |
| 3,410,727 | 11/1968 | Jasinski | 136/86 |
| 3,874,928 | 4/1975 | Will | 136/6 R |
| 4,127,703 | 11/1978 | Holleck | 429/57 |
| 4,312,928 | 1/1982 | Van Deutekom | 429/27 |
| 4,380,576 | 4/1983 | Yoshida et al. | 429/27 |

FOREIGN PATENT DOCUMENTS

| | | |
|---|---|---|
| 54-15139 | 2/1979 | Japan ............... 429/59 |
| 1209753 | 10/1970 | United Kingdom . |
| 1484433 | 9/1977 | United Kingdom . |
| 2003927 | 3/1979 | United Kingdom . |
| 2006514 | 5/1979 | United Kingdom . |

OTHER PUBLICATIONS

G. V. Arbach, et al, "Oxygen Electroreduction Catalysts", IBM Technical Disclosure Bulletin, vol. 25, No. 8, Jan. 1983, pp. 4350–4351.

P. Reuetschi et al, "Sealed Cells with Auxiliary Electrodes", Electrochemical Technology, vol. 4, Nos. 7/8, Jul.–Aug. 1966, pp. 383, 387.

Chemical Abstracts, vol. 94, No. 6, Feb. 9, 1981, p. 192, 94:33716g.

Chemical Abstracts, vol. 92, No. 6, Feb. 1980, p. 481, 92:49282g.

Percheron–Guegan et al, "Hydrogen Electrochemical Storage by Substituted LaNi$_5$ Compounds", Hydrides for *Energy Storage*, p. 485.

Osumi et al, "Hydrogen Absorption-Desorption Characteristics of Mischmetal-Nickel-Aluminum Alloys", *Journal of the Less-Common Metals*, 66 (1979), pp. 67–75.

Chemical Abstract #97-166202, 1982.

*Primary Examiner*—Donald L. Walton
*Assistant Examiner*—Stephen J. Kalafut
*Attorney, Agent, or Firm*—Schwartz, Jeffery, Schwaab, Mack, Blumenthal & Evans

[57] ABSTRACT

Disclosed is a hermetically sealed metalic oxide-hydrogen battery comprising a metallic oxide as a positive electrode active material and hydrogen as a negative electrode active material, characterized in that the negative electrode is composed of a hydrogen storage alloy represented by the formula:

$$MNi_{5-(x+y)}Mn_xAl_y$$

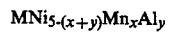

wherein M is a mischmetal (Mm), a lanthanum element or a lanthanum-rich mischmetal (Lm); and x and y are values satisfying relations of $0<x<1$, $0<y<1$ and $0.2 \leq x+y \leq 1$, respectively.

An internal pressure of the battery in this invention does not increase even when a charge/discharge cycle has been carried out for a long period of time, and a discharge capacity can be maintained at a high level over a prolonged period. The battery of this invention is superior to the conventional metallic oxide-hydrogen battery and has a great industrial value.

9 Claims, 10 Drawing Figures

HERMETICALLY SEALED METALLIC OXIDE-HYDROGEN BATTERY USING HYDROGEN STORAGE ALLOY

BACKGROUND OF THE INVENTION

This invention relates to a so-called metallic oxide-hydrogen battery in which a metallic oxide and hydrogen are employed as a positive electrode active material and a negative electrode active material, respectively, and more particularly it relates to a hermetically sealed metallic oxide-hydrogen battery in which a hydrogen negative electrode is composed of a novel composition of a hydrogen storage alloy, its internal pressure is maintained at a lower level, and its self-discharge is also controlled to keep up a long lifetime.

At present, much attention has been paid to the metallic oxide-hydrogen battery in which the hydrogen negative electrode is consititued of the hydrogen storage alloy. The reason is that such a battery system is capable of a safe operation because it can greatly lower the hydrogen pressure in the battery as compared with a conventional metallic oxide-hydrogen battery which does not employ hydrogen storage alloy, and has a capability of being more great a battery capacity per volume.

The hydrogen storage alloy which has often been heretofore studied as the hydrogen negative electrode for this type of battery is $LaNi_5$ (for example, U.S. Pat. No. 3,874,928). Further, an alloy of Ni and a mischmetal (hereinafter referred to as Mm) which is a mixture of lanthanum elements such as La, Ce, Pr, Nd and Sm, that is, an $MmNi_5$ has been also studied.

In the case that such a hydrogen storage alloy is employed in a metallic oxide-hydrogen battery, the internal pressure due to hydrogen of the battery is indeed lower than that of the battery (50 kg/cm² or less) in which any hydrogen storage alloy is not used. However, the internal pressure of the battery including the hydrogen storage alloy is still within the range of 2 to 5 kg/cm² at ordinary temperature since the equilibrium plateau pressure of these hydrogen storage alloys is not sufficiently low.

When the hydrogen pressure in the battery is higher than atmospheric pressure, a battery container must be structurally strongly manufactured to some extent, and further the following disadvantageous problems will be characteristically induced: A first problem is that since hydrogen molecules are small in molecular diameter, they will inevitably leak from the battery container, though the leakage is gradual, which will noticeably impair its safety. And a second problem is that the metallic oxide electrode as the positive electrode is reduced by the hydrogen gas in the battery so that its battery capacity will decrease and thereby self-discharge of the battery will be led.

For these reasons, it has been suggested to employ, as the hydrogen negative electrode, a hydrogen storage alloy having a low equilibrium plateau pressure, and there have been conducted researches on such a kind of various alloys.

For example, with regard to $LaNi_5$ and $MmNi_5$, their equilibrium plateau pressures are as high as about 3 atm and 15 atm, respectively at ordinary temperature; but if a portion of Ni therein is replaced with another element, their equilibrium plateau pressures will be lowered. Especially, a ternary alloy in which a portion of Ni is replaced with manganese (Mn) has been considered to be most preferable as the material for the hydrogen negative electrode, because it will scarcely induce the decrease in an amount of stored hydrogen, that is, the deterioration in an electrode capacity when compared with other alloys in which a portion of Ni is replaced with elements other than Mn (for example, see "Hydrogen Electrochemical Storage by Substituted $LaNi_5$ Compound", A. Percheron-Guegan et al. in *Hydrides for Energy Storage* at page 485 (A. F. Andresen et al. eds. 1978), published by Pergamon Press).

However, if the hydrogen negative electrode is actually made from the above ternary hydrogen storage alloy including Mn and is repeatedly subjected to a charge/discharge cycle in an aqueous solution of an alkaline such as KOH or NaOH, a lifetime of the negative electrode will expire when the charge/discharge cycle has been repeated 50 to 100 times.

On the other hand, in order to hermetically seal a battery, it is a problem which should be considered that the prevention of increment in the inner pressure of a battery due to oxygen generated from a positive electrode at the last stage of charging.

In the hermetically sealed alkaline storage battery, the negative electrode is generally designed so as to be greater in capacity than the positive electrode, and a part of an excess amount being in the discharge state and the remainder in the charge state. The reason for this is to achieve a rapid absorbing (or reducing), on the negative electrode, of the generating oxygen gas from the positive electrode at the last stage of charging and overcharged state. The internal pressure of the battery can be controlled at a low level and the battery can be maintained in the hermetical condition so long as the above-mentioned absorption reaction makes smooth progress.

Since it is proportional to the oxygen pressure, a rate of the oxygen absorption reaction will be accelerated along with a rise of the oxygen pressure in the battery, and the reaction rate will subsequently be equal to an oxygen generating rate (charging current) at a certain pressure. At this point of time, the rise of the battery internal pressure will be finally halted and show a constant value, but until this equilibrium point, on the negative electrode, the charge reaction rate (charging current) of the active material will be greater than the rate of the oxygen absorption reaction. Therefore, the capacity which is to be discharge state in the excess capacity of the negative electrode must be excessively greater by at least an electrical capacity content required in the interval of to a point that the internal pressure shows a constant value, i.e. a point that the quantitative absorption begins.

In the practical use of the hermetically sealed alkaline storage battery employing the hydrogen storage alloy electrode, there is one serious problem that the absorbing reaction of the above oxygen gas (the oxygen reducing reaction) on the hydrogen storage alloy negative electrode is slow.

This oxygen absorbing rate being slow means that a high oxygen pressure is necessasry until the quantitative absorption of oxygen begins, so that the capacity of the negative electrode which should be in excess of the positive electrode must be increased as much as a corresponding electrical capacity. In addition, the oxygen internal pressure of the battery will increase, whereby expansion of the battery and leakage of the liquid will be apt to occur. Further, the negative electrode will occupy a large space in the battery container having a fixed size, therefore the capacity of the battery will be decreased and the effect of using the hydrogen storage alloy electrode will be reduced.

Accordingly, an attempt is made to incorporate an oxyen reducing catalyst into the hydrogen storage alloy electrode for the purpose of accelerating the oxygen absorbing rate on the negative electrode. As the most effective one of such oxygen reducing catalysts, platinum or silver is known. However, platinum or silver is expensive, and it has additionally been found that if platinum or silver is incorporated into the hydrogen storage alloy electrode, its oxygen absorbing power is not so high than the capacity to be expected and the internal pressure of the battery will rise.

One of the reasons that the oxygen absorbing rate is not so fast on the hydrogen storage alloy negative electrode is the way the electrode is prepared. The hydrogen storage alloy will be finely pulverized at the time of the absorption of hydrogen. Therefore, the application of the hydrogen storage alloy as the hydrogen electrode to the negative electrode of the battery is often accomplished by mixing the previously powdered alloy with a plastic binder, bringing the mixture to a paste-like or a sheet-like kneaded material, and causing the material to compressedly and integrally adhere to a current collector in order to thereby form a so-called plastic-bonded electrode. This system can be prepared more easily than a sintered electrode but has the following drawbacks.

Namely, the plastic-bonded negative electrode has a smaller surface porosity and area which actually contacts with oxygen will become low as compared with the sintered system negative electrode. Thus, the oxygen absorbing rate of the plastic-bonded negative electrode will be lower.

The plastic binder system electrode has also the problem of a mechanical peeling. In this system, the kneaded sheets material is, in general, compressedly adhered to the opposite sides of the current collector to form an integral body, but when the material is wound spirally, the outside kneaded sheets material will tend to peel off on the opposite sides of the current collector because of their different curvatures. This phenomenon will substantially lead to the reduction in the capacity of the electrode and will cause the ceterioration in the battery properties.

In the aforesaid "Hydrogen Electrochemical Storage by Substituted LaNi$_5$ compound", A. Percheron-Guegan et al., there is described a LaNi$_{5-x}$Al$_x$ and LaNi$_{5-x}$Mn$_x$ alloy, but there is no description concerning an electrode using a quaternary alloy comprising La-Ni-Mn-Al, and no reference is made to to life span. Further, in "Hydrogen absorption-Desorption Characteristics of Mischmetal-Ni-Aluminum alloys in Hydrogen atmosphere", Y. Osumi et al., J. Less-Common Metals, 66, 67 (1979), there is a description concerning Mm-Ni-Al alloy, but it is not used for an electrode.

SUMMARY OF THE INVENTION

An object of this invention is to provide a hermetically sealed metallic oxide-hydrogen battery using a hydrogen storage alloy, which having a large capacity and a prolonged life span in which the above-mentioned problems involved in a battery which employs a hydrogen storage alloy as a negative electrode can be overcome, a hydrogen pressure in the battery can be maintained at a lower level to prevent leakage of hydrogen and thereby ensure safety of the battery, and self-discharge can also be inhibited.

Another object of this invention is to provide a hermetically sealed metallic oxide-hydrogen battery in which an oxygen absorbing rate on the hydrogen storage alloy negative electrode can be accelerated to retain the internal pressure at a lower level and to thereby prevent damage of the battery at work and which has a high energy density and a great battery capacity.

Still another object of this invention is to provide a hermetically sealed metallic oxide-hydrogen battery having a negative electrode comprising a so-called plastic-bonded hydrogen storage alloy electrode, by which battery an oxygen absorbing rate on the negative electrode is accelerated to prevent the rise of the internal pressure and the liquid leakage and the peeling of a kneaded sheet material on the electrode can be restrained.

The present inventors have conducted intensive research on the above-mentioned ternary hydrogen storage alloy with the intention of accomplishing the aforesaid objects, and as a result, it has been found that if a predetermined amount of aluminum (Al) is added to the ternary alloy, the resulting quaternary alloy will be able to have a longer life span under a charge/discharge cycle, though some deterioration in a battery capacity is induced. This found knowledge has permitted the development in the metallic oxide-hydrogen battery in which the negative electrode is composed of the above-mentioned quaternary alloy.

That is, the hermetically sealed metallic oxide-hydrogen battery of this invention in which a metallic oxide is used as a positive electrode active material and hydrogen is used as a negative electrode active material is characterized in that the negative electrode comprises a hydrogen storage alloy represented by the formula:

$$MNi_{5-(x+y)}MN_xAl_y$$

wherein M is one of a mischmetal, a lanthanum element or a lanthanum-rich mischmetal; and x and y are values satisfying relations of $0<x<1$, $0<y<1$ and $0.2 \leq x+y \leq 1$.

In this invention, it is preferred that a phthalocyanine or porphyrin is added, as an oxygen reducing catalyst, to the negative electrode having the above-mentioned constitution in order to accelerate the oxygen absorbing rate on the negative electrode at the end of charging and at the time of overcharging and to thereby maintain the internal pressure of the battery due to oxygen at a lower level.

In this invention, it is preferred that the negative electrode comprises a current collector having, on its only one side, one kneaded sheet material composed of hydrogen storage alloy grains and a plastic binder; this negative electrode is spirally wound together with the positive electrode with the interposition of a separator; and the wound integral body is received in a cylindrical metallic can, with the current collctor uncovered on an outermost periphery of the wound integral body of the electrodes. According to this consitution, the hermetically sealed rechargeable battery can be obtained which has the hydrogen storage alloy electrode where the kneaded material sheet will not peel off and the oxygen absorbing rate is heightened.

DESCRIPTION OF THE PREFERRED EMBODIMENTS

This invention will be described in detail as follows:

In a battery of this invention, there is employed, as a positive electrode, nickel oxide (NiOOH) which may be obtained by impregnating an active material such as nickel hydroxide (Ni(OH)$_2$) into a sinter of metallic nickel and subjecting it to a chemical treatment. And silver oxide (Ag$_2$O or AgO) electrode is also applicable in this invention.

As a negative electrode, there is used a sheet electrode obtained by mixing an undermentioned hydrogen storage alloy including hydrogen therein which is a negative electrode acitive material with a plastic binder such as polytetrafluoroethylene and forming the mixture into a shape of a sheet.

The hydrogen storage alloy used in this invention is a quaternary alloy represented by the general formula:

$$MNi_{5-(x+y)}Mn_xAl_y$$

In this alloy, M is (1) a so-called mischmetal (Mm) which is a mixture including about 15% by weight of La, about 30% by weight of Ce and other elements such as Nd, Pr and Sm; (2) one element taken out from lanthanum elements through purification, particularly preferably La; or (3) a lanthanum-rich mischmetal (Lm) which includes a good deal of La component.

In this alloy, Mn is a component for serving to lower an equilibrium plateau pressure without decreasing an amount of hydrogen to be stored, and Al is a component for serving to prolong the life span of the negative electrode including the alloy.

Amounts of Mn and Al are indicated with x and y, respectively, but in this invention, x, y and the total amount of x and y, i.e. x+y are required to be within the ranges of satisfying relations of $0<x<1$, $0<y<1$ and $0.2 \leq x+y \leq 1$. The amounts of Mn and Al, i.e. x and y can optionally be varied within the above-mentioned ranges. In the case of $x \geq 1$, $y \geq 1$ or $x+y > 1$, a capacity of the negative electrode will be lower up to ⅔ or less of a capacity that will be obtained by the electrode composed of a conventional alloy such as LaNi$_5$ or MmNi$_5$. Further, in the case of $x=0$, $y=0$ or $x+y<0.2$, the equilibrium plateau pressure of an alloy manufactured therefrom will be greater than 1 atm and the internal pressure due to hydrogen of the battery will rise.

It should be noted that the addition of Al will be effective to prolong the life span of the negative electrode but will simultaneously inversely lead to the deterioration in the electrode capacity. Therefore, the values of x and y should be decided in view of aimed and desired battery properties.

When x+y is within the above-mentioned range, in the case of the alloy in which M is lanthanum, particularly preferable range is $0.2 \leq x+y \leq 0.7$, and $0<x<0.7$ and $0<y<0.5$ are preferable. And in the case of the alloy in which M is the lanthanum-rich mischmetal, it is preferred that x+y satisfies the relation of $0.3 \leq x+y \leq 0.9$, and $0<x<0.9$ and $0<y<0.5$ are preferable. Further, in the instance where the alloy in which M is mischmetal is used, it is preferred that x+y satisfies the relation of $0.4 \leq x+y \leq 1$, and $0<x<1$ and $0<y<0.4$ are preferable.

Such a quaternary alloy can be obtained in the form of a uniform solid solution by mixing predetermined amounts of powders of constitutional elements with one another which depend on an aimed composition and melting the resulting powdery mixture, for example, in a vacuum arc melting furnace. Further, the preparation of a powdery material from this solid solution can easily be carried out by grinding it or by such an activating treatment as the manner of subjecting it to a hydrogen atmosphere of about 40 kg/cm$^2$ at ordinary temperature.

In this invention, it is further preferred that a phthalocyanine or porphyrin is added, as an oxygen reducing catalyst, to the negative electrode. The addition of such an compound permits accelerating an oxygen absorbing rate and preventing a rise of the internal pressure of the battery.

In this invention, the phthalocyanine or porphyrin to be added as the oxygen reducing catalyst to the hydrogen storage alloy may be a phthalocyanine group or porphyrin group itself, or may be a compound in which two hydrogen atom of the two —NH groups are replaced with metallic atoms, another compound corresponding thereto, or its derivative. Their concrete examples are as follows:

Examples of the phthalocyanines include compounds represented by $C_{32}H_{18}N_8$, $C_{32}H_{16}N_8M$ (M=Be, Ca, Cd, Co, Cu, Fe, Mg, Mn, Ni, Pb, Zn, Sn or Ag), $C_{32}H_{16}N_8M'_2$ (M'=Li or Na), $C_{32}H_{15}AlC_{12}N_2$, $C_{32}H_{16}AlClN_8$, $C_{32}H_{16}GaClN_8$, $C_{32}H_{16}SnCl_2N_2$, $C_{32}H_{16}CrFN_8$, $C_{32}H_{16}CuO_{12}S_4N_8$ and $C_{32}H_{17}ClN_8$, and they can be used alone or in combination with one another.

Examples of the porphyrins include known various derivatives which have one or more substituents such as a methyl group, an ethyl group, a vinyl group and the like at any of 1 to 8 positions and/or α to δ positions of porphine nucleus, and each of the porphine nucleus may have a metal element such as Zn, Cu, Ni, Co, Fe, Mn, Ag, In, V, Hg, Tl, Sm, Pt, Rh, Mg, Ca, Ge, Pb, Ba, Cd, Cr, Al, Ti or Mo, and they can be used alone or in combination with one another.

In this invention, manners of adding such a catalyst as the phthalocyanine or porphyrin to the hydrogen storage alloy negative electrode an exemplarily be enumerated as follows:

A first manner comprises dissolving or dispersing the phthalocyanine or porphyrin in a solvent; applying it on the hydrogen storage alloy negative electrode; and evaporating the used solvent. In this case, as the solvent, there can be used dimethylformamide (DMF), quinoline, acetone and water as well.

A second manner is a method of directly provinding the hydrogen storage alloy negative electrode with the phthalocyanine or porphyrin by virture of a sputtering process or vacuum evaporation method.

A third manner comprises directly mixing the phthalocyanine or porphyrin, or materials which are carried the catalysts on a carrier material such as active carbon or nickel powder with the hydrogen storage alloy to prepare an electrode material and using the prepared electrode material as the negative electrode.

A fourth manner comprises dispersing the phthalocyanine or porphyrin in an aqueous alkaline solution and using the resulting dispersion as an electrolyte of the battery.

A fifth manner comprises coating the phthalocyanine or porphyrin onto the inside wall of a battery case, which will receive the wound generative body, with the aforesaid catalyst; and placing the body in the battery case so that the catalyst on the battery case may contact with the hydrogen storage alloy negative electrode.

In this invention, it is further preferred that a hydrogen storage alloy negative electrode has a structure as described hereinafter.

Figure 7:
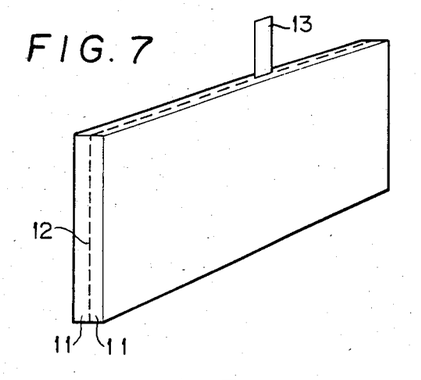
FIG. 7 is a perspective view of a negative electrode comprising a conventional hydrogen storage alloy electrode.
Figure 8:
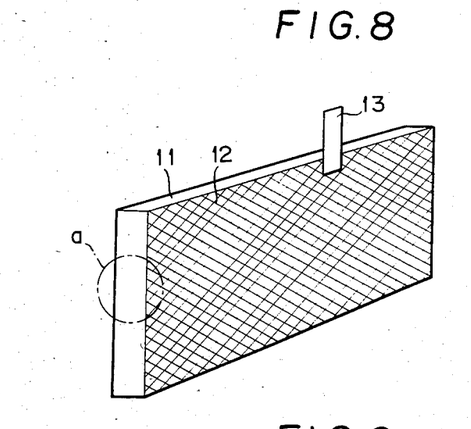
FIG. 8 is a perspective view of the negative electrode comprising a hydrogen storage alloy electrode used in this invention.
Figure 9:
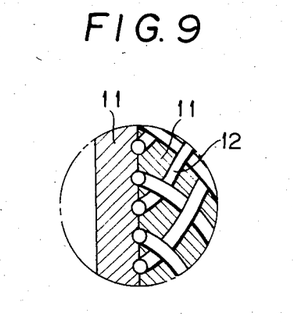
FIG. 9 is an enlarged perspective view of portion a in FIG. 8.

That is, a conventional plastic-bonded negative electrode is composed of a current collector 12 and kneaded sheets material 11 bonded on the opposite sides of the current collector 12 as shown in FIG. 7. On the contrary, in this invention, the kneaded sheet material 11 is bonded only on either side of the current collector 12 as shown in FIG. 8. FIG. 9 is an enlarged perspective view of portion a in FIG. 8. In this case, as usable materials of the current collector, nickel can firstly be mentioned and usual materials such as nickel-plated steel, copper and silver can also be employed. As for the shape of the current collector, a net body, an expanded plate and a perforated plate are acceptable, but an area of the current collector with which the kneaded sheet material is covered is preferably ½ or less of the total area of the sheet. When the negative electrode which is bonded to the positive electrode with the interposition of a separator is wound in a spiral form, the winding operation should be carried out so that the current collector may appear on the outside of the spiral body and may be uncovered on the outermost periphery of the spiral body so as to partially expose the negative electrode there. In such a winding constitution, the kneaded sheet material is wrapped in the current collector having a high mechanical strength, therefore the kneaded sheet material will not be peeled from the current collector. On the outermost periphery of the wound spiral body, an uneven portion is present in which the current collector is bounded on the kneaded sheet material, so that spaces appear between the inside surface of the metallic can and the current collctor directly contacting therewith and they function as passages for oxygen. As a result, the area of the negative electrode which will contact with oxygen can be increased and the oxygen absorbing rate can thus be accelerated.

As the plastic binders used in this invention, alkaline-proof materials such as plyvinyl alcohol, carboxyl methyl cellulose, polyolefin, polystyrene and polyethylene can be employed in addtion to PTFE.

As understood from the above-mentioned explanation, in the battery of this invention, the internal pressure due to hydrogen does not increase even when a charge/discharge cycle has been carried out for a long period of time, and a discharge capacity can be maintained at a high level over a prolonged period. Accordingly, it is fair to say that the battery of this invention is more excellent in properties than the conventional metallic oxide-hydrogen battery and has a great industrial value.

Further, in the metallic oxide-hydrogen battery of this invention, the inexpensive phthalocyanine or porphyrin is employed, whereby the oxygen absorbing rate on the hydrogen storage alloy negative electrode can be accelerated in order to maintain the internal pressure of the battery due to hydrogen at a lower level and to thereby prevent damage of the battery at work and whereby remarkable effects such as increases in energy density and battery capacity can be obtained.

Furthermore, according to this invention, there can be provided the hermetically sealed battery in which no peeling phenomenon will occur and the hydrogen storage alloy electrode having the great oxygen absorbing power is employed as the negative electrode.

Now, this invention will be further described in detail in accordance with examples:

EXAMPLE 1

Now, an $NiOOH/H_2$ battery (hereinafter referred to as the $Ni/H_2$ battery) in which $LaNi_{4.6}Mn_{0.3}Al_{0.1}$ is employed as a negative electrode and nickel oxide as a positive electrode is exemplified in the following.

(1) Preparation of a negative electrode

Powdery metallic element materials of La, Ni, Mn and Al were mixed in predetermined amounts with one another, and the resulting mixed powder was melted in a vacuum arc furnace in order to prepare a uniform solid solution the composition of which was $LaNi_{4.6}Mn_{0.3}Al_{0.1}$. This solid solution was ground to grains each having a diameter of about 5 mm and was then subjected to an activating treatment (at a hydrogen pressure of 35 kg/cm$^2$ and ordinary temperature for one hour) to prepare finer grains each having a diameter of 1 to 50 $\mu$m. With regard to the above-mentioned alloy, an equilibrium pateau pressure was 0.4 atm at 30° C.

The alloy grains were mixed with a polytetrafluoroethylene (PTFE) dispersion, were sufficiently kneaded, and were then formed into sheets each having a thickness of 0.4 mm. A mixing ratio of the alloy powder:PTFE was 90:10 in a dry condition.

The two prepared sheets were compressedly bonded to one nickel net (40 mesh) on the opposite sides thereof to prepare, as a negative electrode, a desired electrode body having a thickness of 0.65 mm. The sizes of the electrode were 80 mm×40 mm and a theoretical capacity of the same was 1500 mAh.

(2) Preparation of a positive electrode $Ni(OH)_2$ was allowed to penetrate through a porous nickel sintered body and was subjected to a chemical treatment to prepare an NiOOH electrode which would be used as the positive electrode. The sizes of the electrode were 0.65 mmt×60 mm×40 mm and a theoretical capacity of the same was 650 mAh.

(3) Preparation of a battery

Together with the above-mentioned negative and positive electrodes, a polyamide nonwoven fabric having a thickness of 0.2 mm was employed as a separator and the composite material was wound spirally to form a wound generative body, and it was inserted in an AA size battery case. Thereafter a hermetically sealed battery shown in FIG. 1 was prepared.

Figure 1:
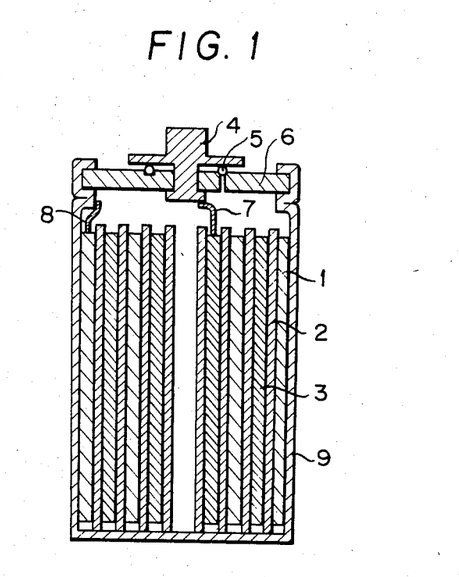
FIG. 1 is a schematic section of a battery according to this invention.

In FIG. 1, reference numeral 1 is a negative electrode, numeral 2 is a separator containing an 8 M-KOH electrolyte, and numeral 3 is a positive electrode. Reference numerals 4 is a terminal of the positive electrode, 9 is a terminal of the negative electrode combined with an armored can, and 7 and 8 are respective lead wires of the above. Reference numeral 6 is a sealed plate having a safety valve 5. An internal pressure of the electrode was measured by making a small hole at a part of the armored can and setting up a pressure gauge thereto. And a nominal capacity of the battery is 600 mAh.

(4) Properties of the battery

In the first place, the internal pressure of this battery was regulated to 1 atm (0 kg/cm$^2$), and a charge/discharge cycle which comprised charging at 200 mA for 3 hours and discharging similarly at 200 mA up to 1.0 V of the battery voltage was repeated.

At this time, a discharge capacity of the battery was measured, and a relation between the internal pressure of the battery and a frequency of the charge/discharge cycle was also measured at the end of the discharging.

Figure 2:
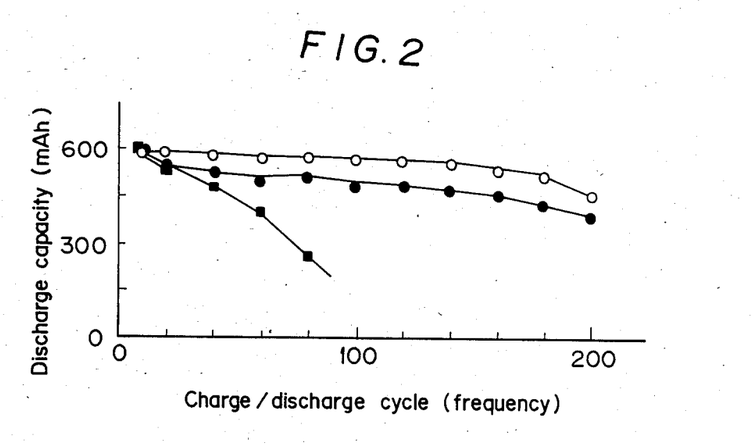
FIGS. 2 to 5 all are graphs showing properties of the battery.
Figure 3:
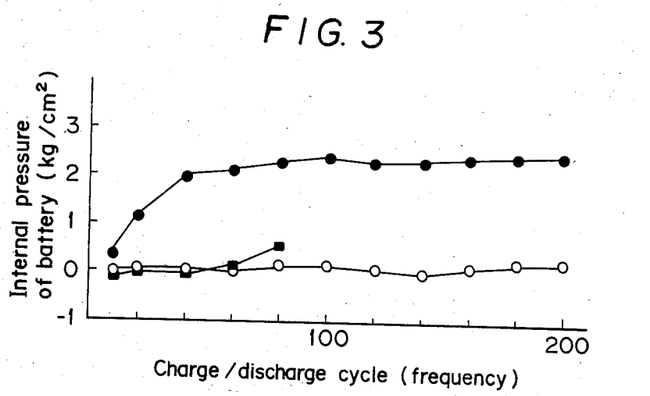

For comparison, LaNi$_5$ (equilibrim plateau pressure at 30° C.=3.0 atm) and LaNi$_{4.6}$Mn$_{0.4}$ (equilibrium plateau pressure at 30° C.=0.3 atm) were used as hydrogen storage alloys to prepare batteries each having the same structure as shown in Example 1, and similarly, a discharge capacity of each prepared battery and a relation between the internal pressure of each battery and a frequency of the charge/discharge cycle were measured. These results are set forth in FIGS. 2 and 3. In the drawings, a line having white circles, another line having black circles and still another line having black rectangles are concerned with the battery of this invention, the battery employing LaNi$_5$ and the battery employing LaNi$_{4.6}$Mn$_{0.4}$, respectively. As be definite from FIGS. 2 and 3, the battery of this invention had the almost unvaried discharge capacity and the unrisen internal pressure, even after the charge/discharge cycle was repeated 200 times. On the contrary, it was confirmed that the batteries for comparison disadvantageously had the remarkably increased internal pressure before 100 charge/discharge cycles or the halved discharge capacity.

EXAMPLE 2

The same procedure as in Example 1 was repeated with the exception that the hydrogen storage alloy as the negative electrode was replaced with MmNi$_{4.2}$Mn$_{0.6}$Al$_{0.2}$ (equilibrium plateau pressure at 30° C.=0.3 atm) in order to prepare a battery, and its properties were inspected.

For comparison, a battery in which the negative electrode comprised MmNi$_{4.2}$Mn$_{0.8}$ (equilibrium plateau pressure at 30° C.=0.25 atm) was similarly inspected about its properties. These results are set forth in FIGS. 4 and 5. In these drawings, a line having white triangles and another line having black ones are concerned with the battery of this invention and the comparative battery, respectively.

Figure 4:
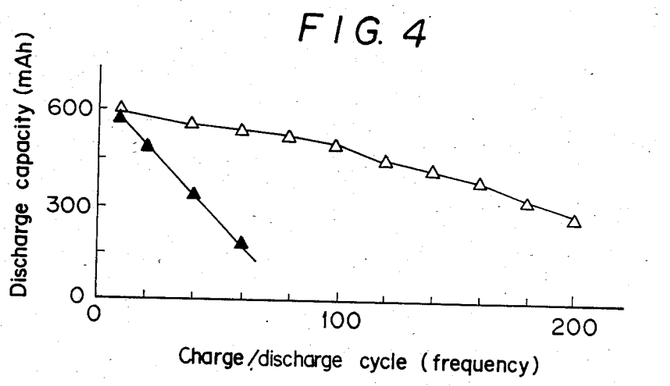
Figure 5:
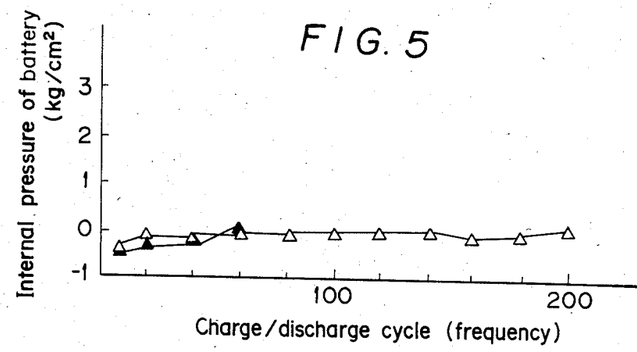

FIGS. 4 and 5 indicate that the battery of this invention had a prolonged life span but the comparative battery had the halved disharge capacity after the charge/discharge cycle was repeated only 50 times although the internal pressure of both batteries was rather low.

EXAMPLE 3

This example is connected with the case where this invention was applied to an AA size hermetically sealed Ni/H$_2$ battery in which LmNi$_{4.4}$Mn$_{0.4}$Al$_{0.2}$ was used as a negative electrode. The same procedures as (1) to (2) in Example 1 were applied to preparation of a negative and a positive electrodes.

The positive electrode was put over the negative electrode via a polyamide nonwoven fabric separator, and the resulting integral member was wound in a spiral form so as to be received in a vessel in order to prepare a wound generative body. This winding operation was carried out so that the negative sheet electrode might be exposed on an outermost periphery of the wound body.

Afterward, each 500 mg of cobalt phthalocyanine ($C_{32}H_{16}CoN_8$), iron phthalocyanine ($C_{32}H_{16}FeN_8$), silver phthalocyanine ($C_{32}H_{16}AgN_8$) and cobalt porphyrin (cobalt tetraphenylporphyrin=$C_{44}H_{28}CoN_4$) was separately dispersed in 50 cc of dimethylformamide (DMF). Next, a wad of absorbent cotton picked up by a pincette was dipped in each resulting dispersion, and the negative electrode exposed on the outermost periphery of the wound body was coated with the dispersion by being rubbed with the wad of cotton several times to provide the catalyst. Afterward, the DMF solvent was evaporated. At this time, the negative electrode was provided with about 9 mg of the catalyst. The wound body including the catalyst was placed in the vessel. The electrolyte was then poured into the vessel, and sealing was carried out to prepare the desired AA size Ni/H$_2$ battery as shown in FIG. 1. A nominal capacity of the battery was 600 mAh.

In this manner, the above-mentioned four oxygen reducing catalysts were used to prepare four kinds of batteries [i.e. a battery (No. 1) including cobalt phthalocyanine, a battery (No. 2) including iron phthalocyanine, a battery (No. 3) including silver phthalocyanine and a battery (No. 4) including cobalt porphyrin].

Figure 6:
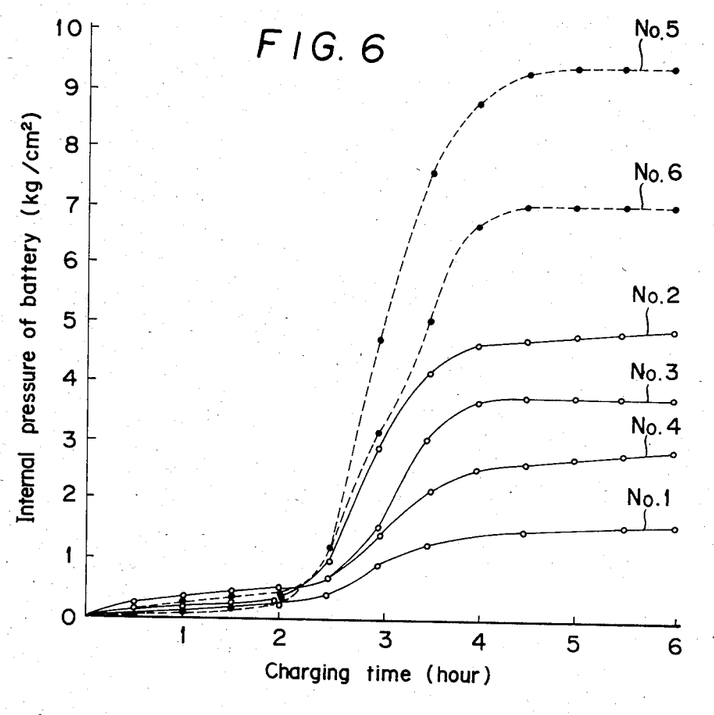
FIG. 6 is a graph showing a variation of an internal pressure of the battery with a lapse of charging time.

During charging at 200 mA for 6 hours of an accelerating test, a variation in the internal pressure of each battery was measured till an overcharge condition was reached, and influences of the four catalysts on the oxygen absorbing rate were compared. The results are shown by solid lines in FIG. 6.

For comparison with this invention, a battery (No. 5) having no catalyst and a battery (No. 6) having a platinum black catalyst on an outermost periphery of its wound body, each of which was used LaNi$_5$ as a negative electrode, were prepared in accordance with the same procedure as mentioned above. These batteries were also overcharged under the same conditions as mentioned above, and at this time, a variation in the internal pressure of each battery was measured. The results are represented by dotted lines in FIG. 6.

As be definit from the results represented by the respective lines, in all the batteries Nos. 1 to 4 regarding this invention, the amount of generated oxygen was balanced with the amount of absorbed oxygen, in other words, the internal pressure reached a ceiling level, at a pressure of 5 kg/cm$^2$ or less. Particularly, the battery (No. 1) including cobalt phthalocyanine had as extremely low an internal pressure as 1.5 kg/cm$^2$, which fact was a remarkable effect.

On the contrary, in the battery (No. 5) including no catalyst, the internal pressure was in excess of 9 kg/cm$^2$, and also in the battery (No. 6) having platinum black catalyst, the internal pressure was as high as 7 kg/cm$^2$.

It can thus be considered that these batteries are not practicable. The reason why although the platinum black which has been believed to be most excellent in an oxygen reducing ability was indeed poor in functional effect, the cobalt phythalocyanine was most effective would be that a certain specific surface function might be present between the cobalt phthalocyanine catalyst and the hydrogen storage alloy negative electrode.

EXAMPLE 4

A battery was prepared in the same manner as in Example 3 above, and feeding a catalyst was carried out by dispersing it in an electrolyte. In this case, the used electrolyte was a dispersion prepared by dispersing 10 mg of lithium phthalocyanine ($C_{32}H_{16}Li_2N_8$) in 10 cc of an M-KOH solution, and it was used in an amount of about 2.5 cc.

For the thus prepared battery, a variation in its internal pressure was measured in the same estimating manner as in Example 3, and it was found that a pressure curve reached a ceiling level at about 5.5 kg/cm$^2$, which fact indicated that this battery was effective.

EXAMPLE 5

In preparing a negative electrode, there was used a mixture of $LmNi_{4.4}Mn0.4Al_{0.2}$ and copper phthalocyanine ($C_{32}H_{16}CuN_8$) an amount of which was 1% to a weight of the $LmNi_{4.4}Mn_{0.4}Al_{0.2}$. The preparation of a battery and the measurement of its internal pressure were carried out in the same manner as in Example 3. As a result, it was found that the internal pressure curve reached a ceiling level at about 4 kg/cm$^2$, which fact indicated that this battery was effective.

EXAMPLE 6

A negative electrode consisting of $LmNi_{4.4}Mn_{0.4}Al_{0.2}$ (90%) and PTFE (10%) was prepared and then placed in an evaporator, where a nickel phthalocyanine ($C_{32}H_{16}NiN_8$) catalyst was then deposited on an either side alone of the negative electrode. An amount of the deposited catalyst was about 20 mg in all. The negative electrode having the catalyst and a positive electrode bounded thereto were wound so that the catalyst-deposited surface portion on the negative electrode might appear on an outermost periphery of a wound generative body, in order to prepare a battery. Also for the thus prepared battery, the measurement of its internal pressure was likewise carried out, and it was found that a pressure curve reached an upper limit at about 2 kg/cm$^2$, which fact indicated that it was effective.

EXAMPLE 7

In order to prepare a negative electrode, 90% by weight of an $MmNi_{4.2}Mn_{0.7}Al_{0.1}$ hydrogen storage alloy powder were first mixed and kneaded with 10% (in terms of a solid alone) of a polytetrafluoroethylene (PTFE) dispersion binder, and forming was carried out to prepare a sheet having a thickness of 0.8 mm. The prepared sheet was bonded to the nickel net (40 mesh) on either side thereof and the bonded members were compressed by a press to prepare a thickness of 0.65 mm. The sizes of the negative electrode thus prepared were 80 mm×40 mm (see FIG. 8) and a theoretical capacity of this electrode was 1500 mAh.

Further, a nickel oxide positive electrode (the size of 60 mm long×40 mm wide×0.65 mm thick, and a theoretical capacity of 650 mAh) and a polyamide nonwoven fabric separator were prepared, and the above-mentioned negative electrode was bonded to the positive electrode with the interposition of the separator and was wound in a spiral form so that the current collector of the negative electrode might lie on the outer side of the spiral body and so that the negative electrode might appear on the outermost periphery of the spiral body. The wound spiral body was placed in an AA size metallic can and an 8 N-KOH solution was then poured thereinto, and sealing was carried out to prepare a desired battery of this invention. At this time, a nominal capacity of the battery was 600 mAh.

For comparison, there was prepared a battery having a conventional negative electrode in which kneaded sheets material made in the same manner as in the aforesaid example were integrally bonded to a current collector on the opposite side thereof, as in FIG. 7. In this case, each kneaded material sheet was 0.4 mm thick before bonded to the current collector and was 0.65 mm thick after bonded thereto. The procedure of manufacturing the battery was all the same as in the aforesaid examples.

Now, reference to functional effects of this invention will be made. In the first place, the effect of preventing a peeling phenomenon will be described. The number of the batteries was counted in which the kneaded sheets material peeled off on the outermost perpheries thereof at the time when the integral members each comprising the negative electrode, the positive electrode and the separator therebetween were spirally wound. The results are set forth in Table 1.

TABLE 1

|  | Batteries of this invention | Conventional batteries |
| --- | --- | --- |
| Total number | 20 | 20 |
| Number of peeled batteries | 0 | 12 |
| Peeling rate (%) | 0 | 60 |

In the batteries of this invention, each current collector was arranged on the outer side thereof, accordingly any peeling phenomenon did not occur. On the contrary, of 20 conventional batteries manufactured in Comparative Examples, 12 batteries (60%) peeled off in fact.

Figure 10:
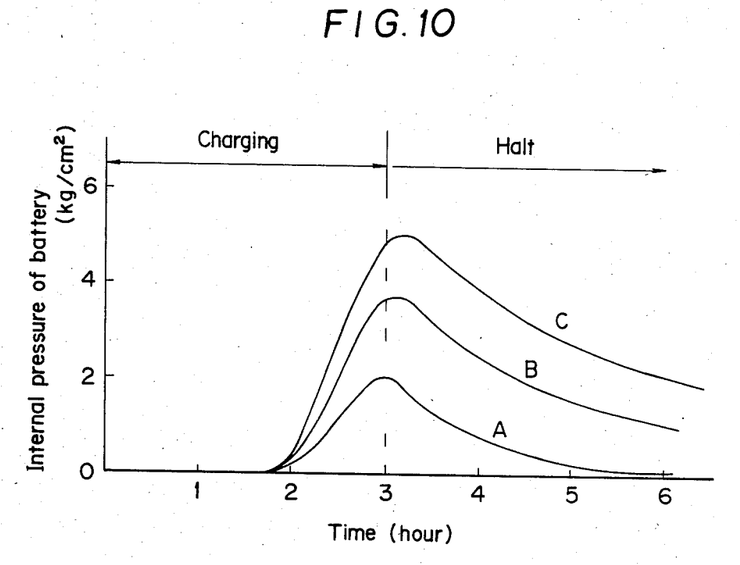
FIG. 10 is a diagram showing properties of a hermetically sealed battery regarding this invention.

Next, the effect of an oxygen absorbing rate was inspected by comparatively observing variations in internal pressures of the batteries. A battery A of this invention, a comparative battery B including no peeling and another comparative battery C including a peeling were used, and the obtained results are shown by curves A, B and C, respectively in FIG. 10. In order to inspect pressure variations, charging the batteries was carried out at 200 mA for 3 hours, and the batteries were afterward allowed to stand while maintaining it as open circuit. From the results in FIG. 10, it will be understood that the battery A was smaller in the increased internal pressure than the batteries B and C, and that in the battery A the internal pressure decreased more swiftly than in the other batteries. The reason why the battery C was greater in the pressure variation than the battery B would be that the battery C had a portion of the kneaded sheet material peeled from the current collector and this portion was not electrically charged and thus did not absorb oxygen, even if brought into contact with it.

We claim:

1. A hermetically sealed metallic oxide-hydrogen battery comprising a metallic oxide as a positive electrode active material and hydrogen as a negative electrode active material, wherein said negative electrode is comprised of a hydrogen storage alloy which contains both Mn and Al, said alloy being represented by the formula:

$$MNi_{5-(x+y)}Mn_xAl_y$$

wherein M is a mischmetal, a lanthanum element or a lanthanum-rich mischmetal; and x and y are values satisfying relations of $0<x<1$, $0<y<1$ and $0.2 \leq x+y \leq 1$, respectively.

2. The hermetically sealed metallic oxide-hydrogen battery according to claim 1, wherein M is a mischmetal comprising about 15% by weight of La, about 30% by weight of Ce and at least one element selected from the group consisting of Nd, Pr and Sm.

3. The hermetically sealed metallic oxide-hydrogen battery according to claim 2, wherein x and y are values satisfying relations of $0<x<1$, $0<y<0.4$ and $0.4 \leq x+y \leq 1$, respectively.

4. The hermetically sealed metallic oxide-hydrogen battery according to claim 1, wherein M is a lanthanum-rich mischmetal.

5. The hermetically sealed metallic oxide-hydrogen battery according to claim 4, wherein x and y are values satisfying relations of $0<x<0.9$, $0<y<0.5$ and $0.3 \leq x+y \leq 0.9$, respectively.

6. The hermetically sealed mettallic oxide-hydrogen battery according to claim 1, wherein said negative electrode is provided with a phthalocyanine, metal phthalocyanine, porphyrin or metal porphyrin as an oxygen reducing catalyst.

7. The hermetically sealed metallic oxide-hydrogen battery according to claim 6, wherein said metal phthalocyanine comprises at least one from the group of compounds represented by the molecular formulae $C_{32}H_{16}N_8M'$, wherein M' is Be, Ca, Cd, Co, Cu, Fe, Mg, Mn, Ni, Pb, Zn, Sn or Ag; $C_{32}H_{16}N_8M''_2$, wherein M'' is Li or Na; $C_{32}H_{15}AlCl_2N_2$; $C_{32}H_{16}AlClN_8$; $C_{32}H_{16}GaClN_8$; $C_{32}H_{16}SnCl_2N_2$; $C_{32}H_{16}CrFN_8$; $C_{32}H_{16}CuO_{12}S_4N_8$ and $C_{32}H_{17}ClN_8$.

8. The hermetically sealed metallic oxide-hydrogen battery according to claim 6, wherein said metal porphyrin comprises at least one compound having at least one metal selected from the group consisting of Fe, Cu, Mg, Ca, Mn, Zn, Cd and Ni.

9. The hermetically sealed metallic oxide-hydrogen battery according to claim 1, wherein said battery has the structure of a hermetically sealed secondary battery in which said negative electrode comprises a kneaded sheet material composed of hydrogen storage alloy grains and a plastic binder, and a current collector composed of a net body, an expanded plate or a perforated plate compressedly bonded to said kneaded material sheet on its either side alone; and said negative electrode which is put on said positive electrode with the interposition of a separator is spirally wound and is received in a cylindrical metallic can, with said current collector uncovered on the outermost periphery of said wound negative electrode so as to expose the side of said kneaded material sheet having compressedly bonded said current collector.

* * * * *